United States Patent
Robison

[11] 3,945,295
[45] Mar. 23, 1976

[54] SOLENOID
[75] Inventor: Leslie P. Robison, Inyokern, Calif.
[73] Assignee: The United States of America as represented by the Secretary of the Navy, Washington, D.C.
[22] Filed: June 10, 1974
[21] Appl. No.: 478,018

[52] U.S. Cl. ............... 89/1.5 D; 294/83 R; 269/8
[51] Int. Cl.² ........................................ B64D 1/04
[58] Field of Search ....... 89/1.5 D, 1.5 R; 294/83 R; 269/237, 254 R, 8

[56]         References Cited
         UNITED STATES PATENTS
2,992,594   7/1961   Anderson et al. ............... 89/1.5 D
3,285,650   11/1966  Dukes ................................ 294/83
3,610,092   10/1971  Miller ............................... 89/1.5 D
3,703,844   1/1972   Bleikamp ......................... 89/1.5 D Primary Examiner—Samuel W. Engle
Assistant Examiner—S. A. Cangialosi
Attorney, Agent, or Firm—R. S. Sciascia; Roy Miller; Gerald F. Baker

[57]              ABSTRACT

An improved solenoid release mechanism for air dropped ordnance apparatus and the like has two pivoted jaws which are locked in closed position when the solenoid coil is energized and are spring biased to the closed position with sufficient force such that a force of about nine pounds in a downward direction will open them when the solenoid coil is not energized. An adjustment device is provided for the biasing means for each of the jaws.

2 Claims, 2 Drawing Figures

SOLENOID

BACKGROUND OF THE INVENTION

Many bomb arming solenoids are found in the prior art and one of the more popular at the present time is disclosed in U.S. Pat. No. 3,200,707 issued 17 Aug. 1965 to W. F. West. The device of U.S. Pat. No. 3,200,707 is designed to hold an arming wire in a slot by means of a plunger co-acting with one wall of the slot. Should something cause the plunger to bind, the arming wire may not be released even though the solenoid is in "Unlocked" condition. According to the present invention the arming wire is held between two jaws so that movement of either jaw will allow removal of the arming wire. Some prior art devices are known which suggest the use of two jaws. One example of the two jaw construction is found in U.S. Pat. No. 2,992,594 issued 18 July 1961 to L. L. Anderson et al. The Anderson device, however, was rather complex and the point of contact of the jaws was placed on the opposite side of the pivot points from the locking means and the means biasing the jaws to a closed position.

According to the present invention, a two jaw release mechanism is provided which is simple and easy to manufacture, is lighweight and compact in structure and which achieves a desired closing force by means of simple wire springs, the force of which can be individually adjusted.

DESCRIPTION AND OPERATION

Figure 1:
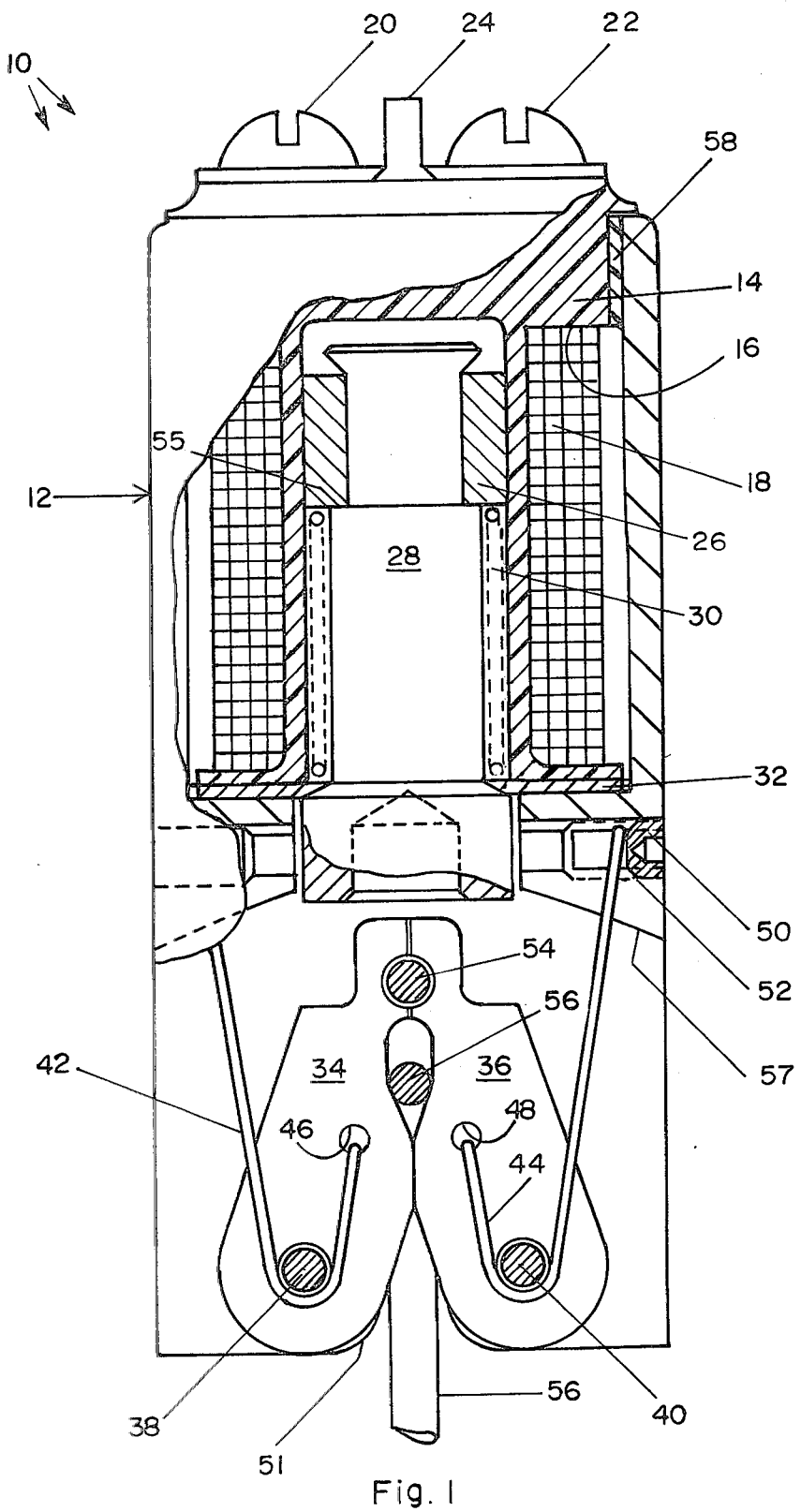
FIG. 1 is a side elevation with parts broken away and partly in cross section of a solenoid actuator according to the present invention.

A practical embodiment of a solenoid actuator device according to the invention is shown in FIG. 1 generally designated by the numeral 10. The parts of the actuator mechanism are contained in a body 12 which is chambered in the upper portion to receive a coil form 14. Coil form 14 has an annular recess 16 in which is wound a coil 18. The two ends of the coil 18 are led through the coil form 14 to external contact screws 20, 22 which are separated by an insulation block 24.

Coil block 14 is bored to receive a core or armature 26 of magnetic material for sliding movement therein. Core 26 is bored to receive one end of a plunger 28 of non-magnetic metal such as stainless steel. Plunger 28 has a central portion sufficiently smaller than the inner bore of coil body 14 to accommodate a compression spring 30 between the opposing walls. Spring 30 is confined between the lower portion of armature 26 and a flat metal washer 32 loosely fitted onto a chamfered portion of plunger 28. The end of plunger 28 remote from armature 26 is bored to provide locking surfaces the function of which will appear later.

The end of body 12 opposite the solenoid is slotted and bored to receive parts of an arming wire latch mechanism. This latch mechanism comprises two jaws 34, 36 pivoted on respective pins 38, 40 and urged to the position shown by wire springs 42, 44. One end of each of the springs is hooked into a hole (46, 48) provided in the respective jaw. The other end of each of the spring abuts against an adjustment screw such as shown at 50 which is contained in a threaded hole 52 in body 12.

Remote from the pivot pin, each jaw terminates in a contour designed to present a semicylindrical surface to a cylindrical stop member 54 and an interrupted planar surface contiguous to the other said jaw when the jaws are in closed position. This end of the jaws is further configured such that, in the closed position, they jointly present opposite surfaces which may be enclosed by the lower end of plunger 28 to lock the jaws in closed position. The jaws are shown in FIG. 1 in closed position with the loop of an arming wire 56 in place between the jaws.

Figure 2:
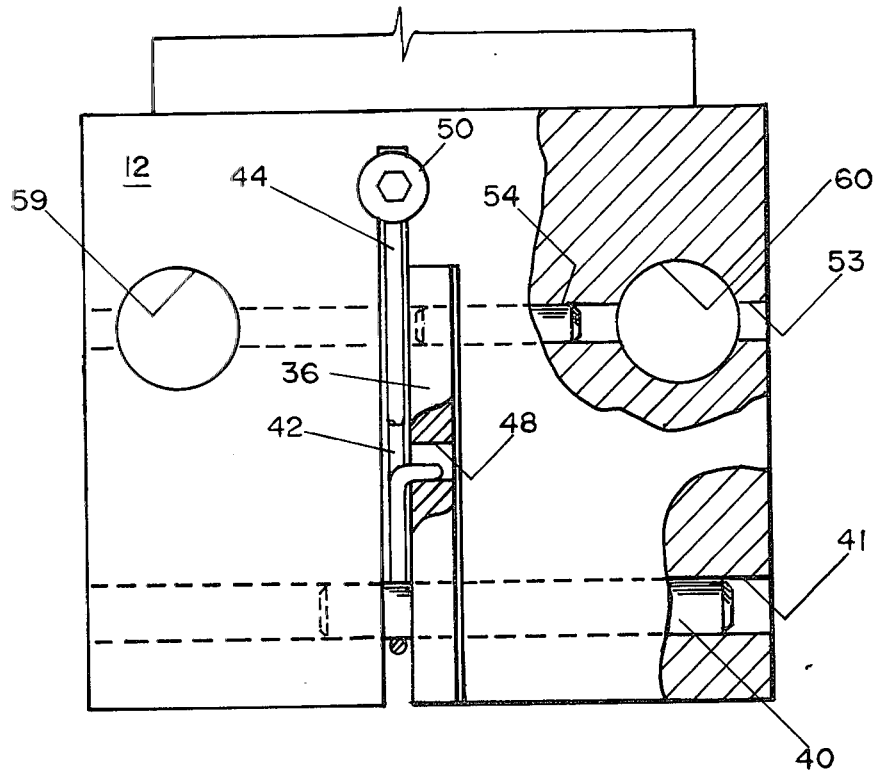
FIG. 2 is a front elevation partly in cross section of the solenoid in FIG. 1.

As shown in FIG. 2, the lower portion of body 12 has a rectangular configuration and is pierced by two mounting holes 59, 60 through which screws may be placed to fasten the solenoid to a bomb rack or the like.

By the above construction, the manufacture of the solenoid actuator has been greatly simplified. To this end the body 12 consists of a unitary piece of metal board, counterbored and slotted to receive the various components. The upper portion of body 12 receives the coil and plunger assembly and the lower receives the safety wire retaining mechanism.

The armature-plunger assembly is put together before placing in the body 12. The washer 32 is placed over plunger 28 followed by spring 30 and core or armature 26. The end of plunger 28 is then upset or peened over as shown so that the core 26 is confined between the upset portion and a shoulder 55 on the plunger. The coil form 14 carrying coil 18 is then placed over the subassembly and fastened in place by an adhesive 58. The ends of coil 18 are led through the adhesive 58 and attached to sockets (not shown) in which are mounted screws 20, 22.

In the lower half of the body 12 the stop pin 54 is inserted through access hole 55 as shown in FIG. 2 and jaws 34, 36 are then positioned in slot 57 and pinned in place by pins 38, 40. The upper ends of springs 42, 44 are then pressed in place by adjustment screws 50 are adjusted to a point where the jaws 34, 36 will release arming wire 56 when a predetermined downward force is applied on the arming wire. The specified pull necessary to meet some requirements is nine pounds.

In operation, the coil 18 is not energized and the plunger 28 remains in its upper "unlocked" position as urged by spring 30. The arming wire 56 is then pushed into the opening as shown in FIG. 1, forcing the jaws 34, 36 to open against the force of springs 42, 44. When the force needed for removing arming wire 56 is set at nine pounds, for example, the force necessary to remove the lock wire from a bomb will be about fourteen pounds. Therefore, if the jaws 34, 36 are not locked before the bomb is dropped, the arming wire will stay with the bomb.

If, on the other hand, it is desired that the arming wire be pulled loose from the bomb, coil 18 is energized before drop, plunger 28 is forced downwardly and the lower end of plunger 28 fits over the upper ends of jaws 34, 36 locking them securely in place. In the locked position the arming wire cannot be pulled from the jaws even by a force several times greater than the breaking strength of arming wire 56.

The cost of producing ordinance release mechanisms has been decreased because of the simplicity of design and reliability has been increased by the use of the two jaw system. Thus, if one jaw were to freeze in place in the unlocked position, the arming wire could still be pulled from the assemble by flexion of the other jaw. Other two jawed release mechanisms have been proposed but the instant device differs from the prior art devices by having the clamping surfaces on the same side of the pivot points on which the spring forces are exerted. This arrangement not only shortens the lever arms needed but also allows simpler spring devices and allows an external rather than internal locking device. That is to say, in known prior devices, since the arming wire was between jaws depending from the pivot point and urged together by a spring means on the other side of the pivot point, the internal ends of the jaws had to be forced together to remove the arming wire and, thus, the inner ends needed to be wedged apart in the "locked" position. By comparison, the instant device is much simpler in construction and compact in size.

What is claimed is:

1. A release mechanism comprising:
   support means;
   two substantially parallel support pins mounted in spaced relationship in said support means;
   a retaining arm pivotally mounted on each of said pins;
   a stop member mounted in said support means and having a longitudinal axis parallel to the axis of said pins; and lying in a plane equidistant between said pins;
   said longitudinal axis being spaced from the plane containing the axis of said pins;
   said arms having complementary shaped upper free ends mating with said stop means and meeting each the other along surfaces in said plane equidistant between said pins;
   each said arm having a relieved portion along said surface between said stop and said plane containing the axis of said pins and forming, in closed position of said arms, an opening therebetween formed by semicircular surfaces adjacent said stop means and tapered surfaces and terminating in contiguous surfaces remote from said stop means and between said stop means and said plane containing the axis of said stop means;
   secondary shaped surfaces on said arms opposite the surfaces engaging said stop means and said secondary surfaces being parallel to the mating planes of said first mating surfaces;
   latching means mounted on said support and selectively movable from a normal position free of said secondary surfaces to a latching position engaging the said secondary surfaces to prevent separation as said arms; and
   spring means urging said arms to said closed position.

2. The release mechanism of claim 1 wherein said biasing means include a wire spring associated with each said arm and having one end connected to said arm intermediate said stop and said pin, looping around said pin and extending back in the same direction; and adjustment means acting against the other end of each spring to adjust the force necessary to move said arm from said stop.

* * * * *